(12) United States Patent
Wang et al.

(10) Patent No.: US 11,361,735 B1
(45) Date of Patent: Jun. 14, 2022

(54) HEAD-MOUNTABLE DEVICE WITH OUTPUT FOR DISTINGUISHING VIRTUAL AND PHYSICAL OBJECTS

(71) Applicant: Apple Inc., Cupertino, CA (US)

(72) Inventors: Paul X. Wang, Cupertino, CA (US);
Jie Gu, Palo Alto, CA (US); Pol Pla I Conesa, Belmont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/171,902

(22) Filed: Feb. 9, 2021

Related U.S. Application Data

(60) Provisional application No. 63/010,485, filed on Apr. 15, 2020.

(51) Int. Cl.
*G09G 5/37* (2006.01)
*G06F 3/01* (2006.01)
*G06F 3/16* (2006.01)

(52) U.S. Cl.
CPC ............ *G09G 5/37* (2013.01); *G06F 3/013* (2013.01); *G06F 3/016* (2013.01); *G06F 3/167* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 9,741,169 B1 | 8/2017 | Holz | |
| 10,475,249 B2 | 11/2019 | Holz et al. | |
| 2012/0143361 A1* | 6/2012 | Kurabayashi | H04R 5/04 700/94 |
| 2016/0104322 A1* | 4/2016 | Fleischmann | G06F 3/017 345/419 |
| 2017/0201709 A1* | 7/2017 | Igarashi | H04N 5/23216 |
| 2018/0332268 A1* | 11/2018 | Xiao | G02B 27/0172 |
| 2019/0073829 A1* | 3/2019 | Holz | G06K 9/00355 |
| 2020/0368616 A1* | 11/2020 | Delamont | A63F 13/25 |
| 2021/0005002 A1* | 1/2021 | Barragan | G06F 3/012 |

* cited by examiner

*Primary Examiner* — Yi Wang
(74) *Attorney, Agent, or Firm* — Bakerhostetler (57) ABSTRACT

A head-mountable device can help a user distinguish between the physical objects and the virtual objects when desired. Indications provided by the head-mountable device can be visually applied to physical objects and/or virtual objects within a view provided by the head-mountable device. The indications can be provided to notify the user of objects outside the view provided by the head-mountable device. The indications can be visual, auditory, and/or haptic in nature. The indications can be provided based on a user's detected action, intention, and/or attention so that the indication is more targeted to a user's needs. The indications can be provided under particular conditions, so that the user can more easily maintain an immersive experience when the indications are not desired.

17 Claims, 5 Drawing Sheets

HEAD-MOUNTABLE DEVICE WITH OUTPUT FOR DISTINGUISHING VIRTUAL AND PHYSICAL OBJECTS

CROSS-REFERENCE TO RELATED APPLICATION

This application claims the benefit of U.S. Provisional Application No. 63/010,485, entitled "HEAD-MOUNTABLE DEVICE WITH OUTPUT FOR DISTINGUISHING VIRTUAL AND PHYSICAL OBJECTS," filed Apr. 15, 2020, the entirety of which is incorporated herein by reference.

TECHNICAL FIELD

The present description relates generally to head-mountable devices, and, more particularly, to outputs provided by a head-mountable device to help a user distinguish between virtual and real objects.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include audio output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device. While a head-mountable device can provide outputs to a user in a variety of ways, it can also be helpful to allow a head-mountable device to receive inputs from a user. A head-mountable device as described herein can provide a user experience that is immersive while allowing the user to interact with the system in a manner that is natural, familiar, and intuitive.

A head-mountable device can be operated to provide a view of physical objects in an physical environment as well as virtual objects that are generated by the head-mountable device. The virtual objects may not have a corresponding physical object in the physical environment. The head-mountable device can provide an immersive experience in which many or all of the objects (e.g., both physical and virtual) are perceived as being real.

However, under certain conditions, it may be desirable for a user to distinguish between the physical objects and the virtual objects. Indications provided by the head-mountable device can help a user make choices that enhance the user's comfort and control by improving the user's awareness of physical objects and/or virtual objects. The indications can further help a user know how to successfully interact with one or more physical objects and/or virtual objects.

It may be useful to provide indications that help the user distinguish between the physical objects and the virtual objects when desired. The indications can be visually applied to physical objects and/or virtual objects within a view provided by the head-mountable device. The indications can be provided to notify the user of objects outside the view provided by the head-mountable device. The indications can be visual, auditory, and/or haptic in nature.

The indications can be provided based on a user's detected action, intention, and/or attention so that the indication is more targeted to a user's needs. The indications can be provided under particular conditions, so that the user can more easily maintain an immersive experience when the indications are not desired.

These and other embodiments are discussed below with reference to FIGS. 1-14. However, those skilled in the art will readily appreciate that the detailed description given herein with respect to these Figures is for explanatory purposes only and should not be construed as limiting.

Figure 1:
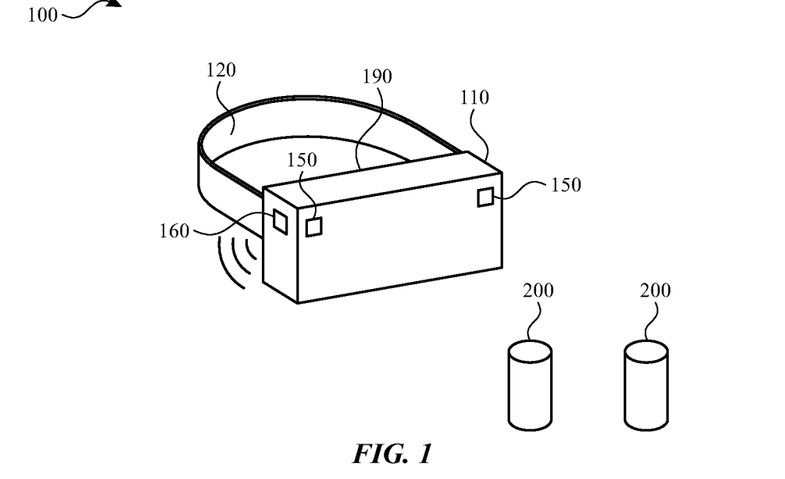
FIG. 1 illustrates a perspective view of a head-mountable device and external devices for operation by a user, according to some embodiments of the present disclosure.

According to some embodiments, for example as shown in FIG. 1, a head-mountable device 100 includes a frame 110 that is worn on a head of a user. The frame 110 can be positioned in front of the eyes of a user to provide information within a field of view of the user. The frame 110 can provide nose pads or another feature to rest on a user's nose. The frame 110 can be supported on a user's head with the securement element 120. The securement element 120 can wrap or extend along opposing sides of a user's head. The securement element 120 can include earpieces for wrapping around or otherwise engaging or resting on a user's ears. It will be appreciated that other configurations can be applied for securing the head-mountable device 100 to a user's head. For example, one or more bands, straps, belts, caps, hats, or other components can be used in addition to or in place of the illustrated components of the head-mountable device 100. By further example, the securement element 120 can include multiple components to engage a user's head.

The frame 110 can provide structure around a peripheral region thereof to support any internal components of the frame 110 in their assembled position. For example, the frame 110 can enclose and support various internal components (including for example integrated circuit chips, processors, memory devices and other circuitry) to provide computing and functional operations for the head-mountable device 100, as discussed further herein. Any number of components can be included within and/or on the frame 110 and/or the securement element 120 and be operably connected to each other.

The frame 110 can include and/or support one or more cameras 150. The cameras 150 can be positioned on or near an outer side of the frame 110 to capture images of views external to the head-mountable device 100. The captured images can be used for display to the user or stored for any other purpose.

The head-mountable device 100 can include one or more speakers 160. Where multiple speakers are provided, the speakers can be directed to each of a user's ears to provide stereo sound. Other speaker arrangements are contemplated, including surround sound. Additionally or alternatively, the head-mountable device 100 can be operably connected to speakers that are directed to, near, or in a user's ears.

A display 190 can optionally transmit light from a physical environment for viewing by the user. Such a display 190 can include optical properties, such lenses for vision correction based on incoming light from the physical environment. Additionally or alternatively, a display 190 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Referring again to FIG. 1, the head-mountable device 100 can be used in conjunction with one or more external devices 200. The external devices 200 can be devices for operation by a user. The external devices 200 can be or include a device that is holdable and/or wearable by a user. The external devices 200 can be input and/or output devices such as a game controller, a remote control, a trackpad, a mouse, a trackball, and the like. Additionally or alternatively, the external devices 200 can be electronic devices, such as a phone, a tablet computing device, a mobile computing device, a watch, a laptop computing device, a stylus, a digital media player, wearable device (clothing, gloves, shoes, jewelry, apparel, and the like), a display, a television, and the like.

Figure 2:
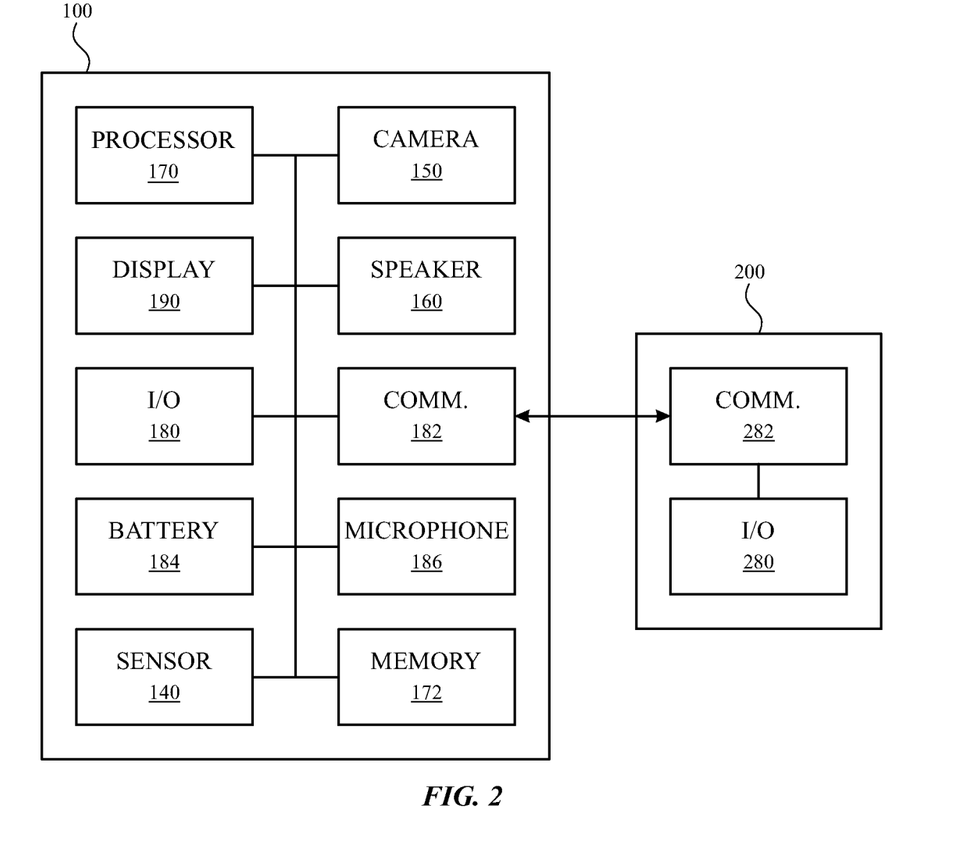
FIG. 2 illustrates a block diagram of a head-mountable device and an external device, in accordance with some embodiments of the present disclosure.

Referring now to FIG. 2, components of the head-mountable device can be operably connected to provide the performance described herein. FIG. 2 shows a simplified block diagram of an illustrative head-mountable device 100 in accordance with one embodiment of the invention. It will be appreciated that components described herein can be provided on either or both of a frame and/or a securement element of the head-mountable device 100.

As shown in FIG. 2, the head-mountable device 100 can include a processor 170 with one or more processing units that include or are configured to access a memory 172 having instructions stored thereon. The instructions or computer programs may be configured to perform one or more of the operations or functions described with respect to the head-mountable device 100. The processor 170 can be implemented as any electronic device capable of processing, receiving, or transmitting data or instructions. For example, the processor 170 may include one or more of: a microprocessor, a central processing unit (CPU), a graphics processing unit (GPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 172 can store electronic data that can be used by the head-mountable device 100. For example, the memory 172 can store electrical data or content such as, for example, audio and video files, documents and applications, device settings and user preferences, timing and control signals or data for the various modules, data structures or databases, and so on. The memory 172 can be configured as any type of memory. By way of example only, the memory 172 can be implemented as random access memory, read-only memory, Flash memory, removable memory, or other types of storage elements, or combinations of such devices.

The head-mountable device 100 can further include a display 190 for displaying visual information for a user. The display 190 can provide visual (e.g., image or video) output. The display 190 can be or include an opaque, transparent, and/or translucent display. The display 190 may have a transparent or translucent medium through which light representative of images is directed to a user's eyes. The display 190 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 100 can include an optical subassembly configured to help optically adjust and correctly project the image based content being displayed by the display 190 for close up viewing. The optical subassembly can include one or more lenses, mirrors, or other optical devices.

The head-mountable device 100 can include a camera 150 for capturing a view of an environment external to the head-mountable device 100. The camera 150 can include an optical sensor, such as a photodiode or a photodiode array. Additionally or alternatively, the camera 150 can include one or more of various types of optical sensors that are arranged in various configurations for detecting user inputs described herein. The camera 150 may be configured to capture an image of a scene or subject located within a field of view of the camera 150. The image may be stored in a digital file in accordance with any one of a number of digital formats. In some embodiments, the head-mountable device 100 includes a camera, which includes an image sensor formed from a charge-coupled device (CCD) and/or a complementary metal-oxide-semiconductor (CMOS) device, a photovoltaic cell, a photo resistive component, a laser scanner, and the like. It will be recognized that a camera can include other motion sensing devices.

The camera 150 can provide one or more windows (e.g., opening, transmission medium, and/or lens) to transmit light for image capture and/or detection. The window can include a light transmitting material. The window can provide optical effects for the transmitted light. For example, the window can include one or more optical components disposed relative to an image sensor, including, for example, a lens, a diffuser, a filter, a shutter, and the like. It will also be understood that the head-mountable device 100 can include any number of cameras. The cameras can be positioned and oriented to capture different views. For example, one camera can capture an image of an object from one perspective and another camera can capture an image of an object from another perspective. Additionally or alternatively, the other camera can capture an image of an object that is not captured by the first camera.

The head-mountable device 100 can include the speakers 160 as described herein. The speakers 160 can be operably connected to the processor 170 for control of speaker output, including sound levels, as described further herein.

The head-mountable device 100 can include one or more sensors 140 for tracking features of the user wearing the head-mountable device 100. For example, such sensors can perform facial feature detection, facial movement detection, facial recognition, eye tracking, user mood detection, user emotion detection, voice detection, etc. Such eye tracking may be used to determine a location of information to be displayed on the display 190.

The sensors 140 can include one or more eye sensors for tracking features of the user wearing the head-mountable device 100, including conditions of the user's eye (e.g., focal distance, pupil size, etc.). For example, such sensors can perform facial feature detection, facial movement detection, facial recognition, eye tracking, user mood detection, user emotion detection, voice detection, etc. For example, an eye sensor can optically capture a view of an eye (e.g., pupil) and determine a direction of a gaze of the user. Such eye tracking may be used to determine a location and/or direction of interest. Detection and/or amplification of sound can then be focused if it is received from sources at such a location and/or along such a direction.

The head-mountable device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics.

Head-mountable device 100 can include a battery 184, which can charge and/or power components of the head-mountable device 100. The battery 184 can also charge and/or power components connected to the head-mountable device 100, such as a portable electronic device.

The head-mountable device 100 can include an input/output component 180, which can include any suitable component for allowing a user to provide input and/or receive output. The input/output component 180 can include, for example, one or more buttons, crowns, keys, dials, trackpads, microphones, touchscreens, haptic devices, and the like. A haptic device can be implemented as any suitable device configured to provide force feedback, vibratory feedback, tactile sensations, and the like. For example, the haptic device may be implemented as a linear actuator configured to provide a punctuated haptic feedback, such as a tap or a knock. The haptic devices can be distributed at different locations to provide directional output. Additionally or alternatively, the input/output component 180 can include any suitable component for connecting the head-mountable device 100 to other devices. Suitable components can include, for example, audio/video jacks, data connectors, or any additional or alternative input/output components.

The head-mountable device 100 can include the microphone 186 as described herein. The microphone 186 can be operably connected to the processor 170 for detection of sound levels and communication of detections for further processing, as described further herein.

The head-mountable device 100 can include communications circuitry 182 for communicating with one or more servers or other devices using any suitable communications protocol. For example, communications circuitry 182 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 182 can also include an antenna for transmitting and receiving electromagnetic signals.

Figure 3:
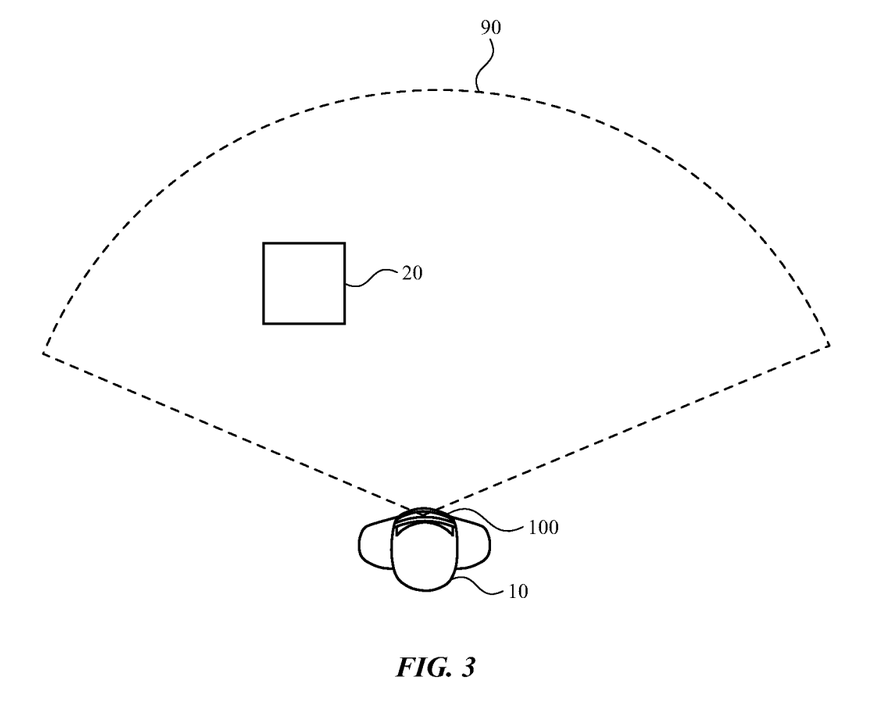
FIG. 3 illustrates a top view of a head-mountable device in use by a user, according to some embodiments of the present disclosure.

FIG. 3 also shows a simplified block diagram of an external device 200 in accordance with one or more embodiments of the disclosure.

The external device 200 can include a communication element 282 for communicating with one or more servers or other devices, such as the head-mountable device 100 via the communications circuitry 182, using any suitable communications protocol. For example, communication element 282 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communication element 282 can also include an antenna for transmitting and receiving electromagnetic signals.

The external device 200 can include an input/output component 280, which can include any suitable component for allowing a user to provide input and/or receive output. The input/output component 280 can include, for example, one or more buttons, crowns, keys, dials, trackpads, microphones, touchscreens, haptic devices, and the like. A haptic device can be implemented as any suitable device configured to provide force feedback, vibratory feedback, tactile sensations, and the like. For example, the haptic device may be implemented as a linear actuator configured to provide a punctuated haptic feedback, such as a tap or a knock. The haptic devices of one external device or multiple external devices can be distributed at different locations to provide directional output. Additionally or alternatively, the input/output component 280 can include any suitable component for connecting the external device 200 to other devices. Suitable components can include, for example, audio/video jacks, data connectors, or any additional or alternative input/output components.

Referring now to FIG. 3, a user can wear and/or operate a head-mountable device that provides outputs to facilitate awareness of physical and/or virtual objects. As shown in FIG. 3, a user 10 can wear the head-mountable device 100, which provides a field-of-view 90 of a physical environment. A physical object 20 can be located within the field-of-view 90. While only one physical object 20 is illustrated in FIG. 3, it will be understood that any number of physical objects 20 can be captured within the field-of-view 90.

The head-mountable device 100 can perform object recognition with respect to the physical object 20. For example, the view can be captured and analyzed by the head-mountable device 100 to determine a characteristic of the physical object 20. Object recognition can be facilitated by a camera of the head-mountable device 100. Additionally or alternatively, object recognition can be facilitated by one or more other sensors of the head-mountable device 100. For example, the head-mountable device 100 can be in communication with another device that performs object recognition and communicates results to the head-mountable device 100. By further example, the head-mountable device 100 can be in communication with a physical object 20 that includes communication circuitry to communicate information to the head-mountable device 100.

It will be understood that a wide variety of physical objects 20 can be recognized, including items, devices, people, buildings, geographic features, locations, and the like. A characteristic of the physical object 20 can include an identity, name, type, reference, color, size, shape, distance, position, velocity, acceleration, make, model, or other feature detectable by the head-mountable device 100.

By further example, an eye-tracking sensor of the head-mountable device 100 can be used to determine which of multiple objects within a field of view of the head-mountable device 100 corresponds to an object that is the focus of the user's gaze. By further example, an emotion tracking sensor can record an emotion corresponding to a user's gaze relating to the physical object 20.

As shown in FIG. 3, a head-mountable device 100 can be configured to detect and identify a limb (e.g., hand, finger, leg, foot, etc.) or other portion of the user 10 wearing the head-mountable device 100. Such detections can be based on operation of a camera and/or another sensor of the head-mountable device 100. For example, the head-mountable device 100 can be configured to capture a view of the limb and/or an item held by or otherwise in contact with the limb. It will be further understood that references to a user or portion thereof can include devices attached to, held by, or worn by the user, including head-mountable device 100 and/or any external device.

Figure 4:
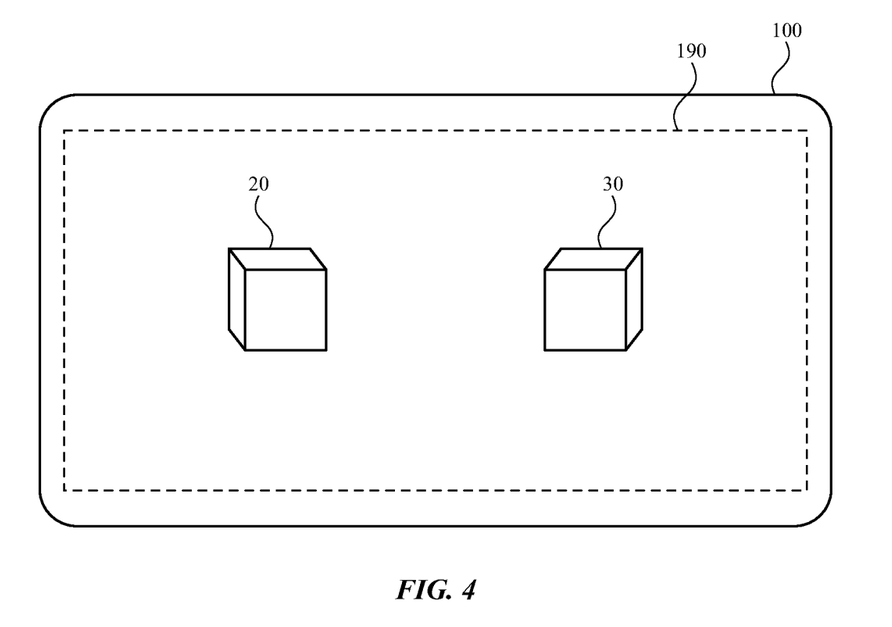
FIG. 4 illustrates a display of a head-mountable device providing a view of a physical object and a virtual object, in accordance with some embodiments of the present disclosure.

Referring now to FIG. 4, the display 190 of the head-mountable device 100 can provide a view of the physical environment, including any physical objects therein. One or more of the displayed items in the view of the display 190 can correspond to physical objects in the physical environment. For example, a camera of the head-mountable device 100 can capture a view of the physical environment. Based on the captured view, the display 190 can provide a display that includes images of the physical objects 20. The view of the physical objects 20 can optionally be rendered based on the physical objects 20 in the physical environment. For example, recognized objects can be rendered having features (e.g., position, orientation, color, size, etc.) that are based on detections of the physical objects in the physical environment.

The display 190 can provide a view of one or more virtual objects 30 that do not correspond to physical objects in the physical environment. For example, the virtual objects 30 can be rendered even when no corresponding physical objects are present in the physical environment. One or more characteristics of the virtual object 30 can be known by the head-mountable device 100 and applied when the virtual object 30 is displayed within the view provided by the display 190. Such virtual object 30 can be displayed as part of a program, at the user's instruction, and/or as automated feedback prompted by a user's activities.

Accordingly, it will be recognized that the view provided by the display 190 can include a view of physical objects 20 and/or virtual objects 30. The user 10 can interact with the physical object 20 within the physical environment, and the display 190 can provide a view of the interaction between the physical object 20 and/or the user 10. Additionally or alternatively, the user 10 can interact with the virtual object 30, for example, by operating input mechanisms of the head-mountable device 100 and/or with user gestures that can be detected and interpreted by the head-mountable device 100 as interactions with the virtual object 30.

Figure 5:
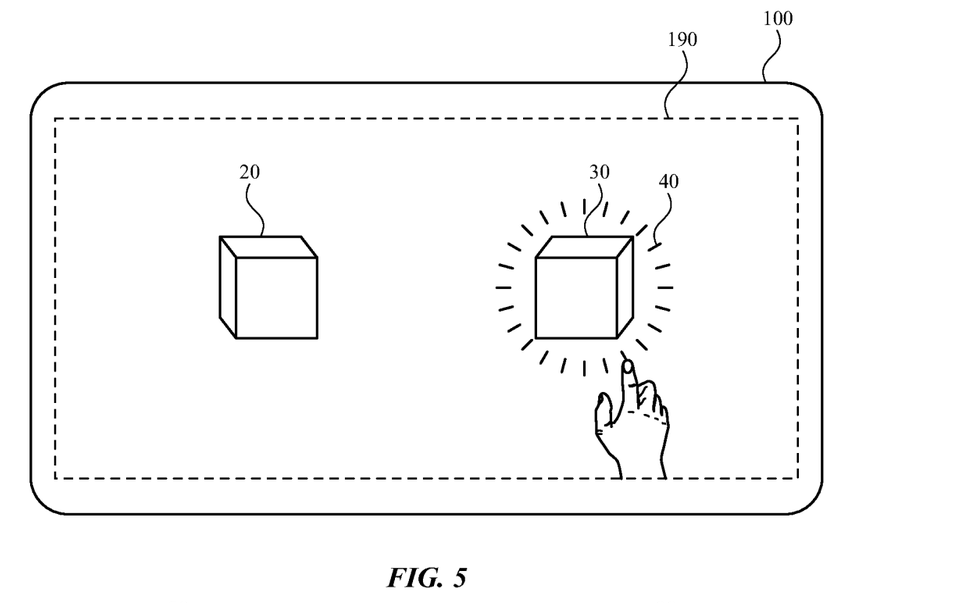
FIG. 5 illustrates a display of a head-mountable device providing a view of a physical object and a virtual object with a visual indicator, in accordance with some embodiments of the present disclosure.

Referring now to FIG. 5, the head-mountable device can provide an output that enhances a user's awareness of a physical object and/or a virtual object. The output can be provided based on one or more conditions that are detectable by the head-mountable device.

As shown in FIG. 5, the display 190 can provide a view of physical objects 20 and/or virtual objects 30, as well as a portion (e.g., limb) of the user that is within the field of view. One or more physical objects 20 provided in the view of the display 190 can correspond to physical objects in an environment. It will be understood that physical objects 20 can be rendered based on corresponding physical objects in the physical environment, whereas virtual objects 30 can be rendered without corresponding physical objects in the physical environment.

An output can be provided based on one or more conditions. The conditions detected by the head-mountable device 100 can represent when a user would want to react to physical objects 20 and/or virtual objects 30. The output can help a user distinguish between physical objects 20 and virtual objects 30 so that the user can then choose an appropriate reaction (e.g., movement, dodging, interaction, grasping, and/or none of the above).

For example, the head-mountable 100 device can detect when a physical object 20 and/or a virtual object 30 is within a threshold distance from the user and/or the head-mountable device 100. Additionally or alternatively, the head-mountable device 100 can detect when a physical object 20 and/or a virtual object 30 is moving toward the user and/or the head-mountable device 100 with a particular speed and/or acceleration. For example, if the user appears ready to interact with a virtual object 30 as if it were a physical object, the head-mountable device 100 can provide an output that helps the user understand that the virtual object is not a physical object in the physical environment and that physical contact will not occur. Additionally or alternatively, the head-mountable device 100 can detect other directions of movement, including moving up and/or down rapidly. It will be understood that movement can be relative, in that such detections can be based on an object moving toward the user and/or the user moving toward the object.

The head-mountable device can be configured to track gestures corresponding to the user's actions. Gesture tracking can be facilitated by a camera of the head-mountable device 100, another sensor of the head-mountable device 100, and/or another sensor external to the head-mountable device 100 (e.g., in an external device held by the user or elsewhere in the physical environment). For example, data can be captured, processed, and are generated by one or more of the head-mountable devices where the data includes captured views of a user's limbs. Gesture recognition can involve the detection of a position, orientation, and/or motion of a user (e.g., limbs, hands, fingers, etc.). Such tracking can be performed to determine gestures with respect to physical objects 20 and/or virtual objects 30. For example, the head-mountable device 100 can track when the limbs and/or an item held by the limbs approaches, contacts, moves, attaches to, and/or moves away from the physical objects 20 and/or the virtual objects 30.

By further example, the head-mountable device 100 can detect whether a user is looking at and/or toward any given physical object 20 and/or virtual object 30. Additionally or alternatively, the head-mountable device 100 can detect a pupil size and/or other characteristic of an eye of the user to determine an anticipated response by the user. For example, such eye characteristics can allow the head-mountable device 100 to determine whether the user is about to react to a physical object 20 and/or virtual object 30 in the line of sight of the user. Such a detection can be used to determine whether an output should be provided to help the user properly distinguish between physical and virtual objects. For example, if the user appears ready to react to a virtual object 30 as if it were a physical object, the head-mountable device 100 can provide an output that helps the user understand that the virtual object is not a physical object in the physical environment and that a physical collision with the object is not imminent.

By further example, an eye-tracking sensor can be used to determine which of multiple objects within a field of view of the head-mountable device 100 corresponds to an object that is the focus of the user's gaze. The head-mountable device 100 can consider eye focus direction, pupil dilation size, pupil dilation duration, pupil dilation latency, and/or other features of the eye to determine whether the user is focusing gaze upon a given object. Based on the determined gaze, one or more of the physical objects 20 and/or the virtual objects 30 can be determined to be a target of the user's attention and/or the intended target of the user's motor activities. By further example, an emotion-tracking sensor can record an emotion corresponding to a user's gaze and/or gestures with respect to the physical objects 20 and/or the virtual objects 30.

The output can be a visual output 40 that is provided with respect to the virtual object 30, as shown in FIG. 5. Additionally or alternatively, the visual output 40 can be applied to the physical object 20. While various types of visual output are discussed below with respect to virtual objects 30, it will be understood that the head-mountable device 100 can provide such visual outputs with respect to any physical object 20 that is detected by the head-mountable device 100. As such, it will be understood that the description herein relating to visual outputs can apply to virtual objects and/or physical objects.

Figure 6:
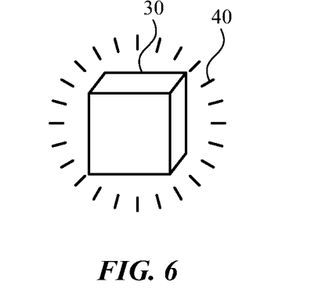
FIG. 6 illustrates a displayed view of a virtual object with a visual indicator providing an emphasis, in accordance with some embodiments of the present disclosure.

Referring now to FIG. 6, a visual output can be provided as an additive feature included with the virtual object. For example, a visual output 40 can include highlighting, glow, shadow, reflection, outline, border, text, icons, symbols, emphasis, duplication, aura, and/or animation provided with the view of the virtual object 30. Such a visual output 40 can be provided optionally without altering the appearance of the virtual object 30. For example, the visual output 40 can be provided about an outer periphery of the virtual object 30. Additionally or alternatively, the visual output 40 can be provided with partial or entire overlap (e.g., overlaid) with respect to the virtual object 30. The visual output 40 can appear to violate physical laws, such as by casting a shadow that does not appear where it would if the virtual object 30 were a physical object in the physical environment.

Figure 7:
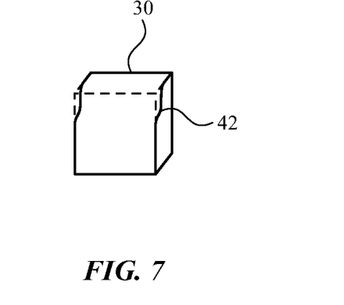
FIG. 7 illustrates a displayed view of a virtual object with a visual indicator providing a modification to the shape of the virtual object, in accordance with some embodiments of the present disclosure.

Referring now to FIG. 7, a visual output can alter an appearance of a virtual object itself. As shown in FIG. 7, a visual output 42 can be provided as a deformation of the virtual object 30 from an initial shape. For example, as a user approaches and/or comes into contact with a virtual object 30, the virtual object 30 can deform on a side near the user. It will be understood that such deformations can also apply to visual outputs such as those depicted in FIG. 6.

Figure 8:
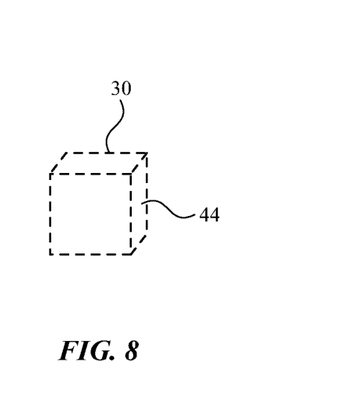
FIG. 8 illustrates a displayed view of a virtual object with a visual indicator providing a modification to the view of the virtual object, in accordance with some embodiments of the present disclosure.

Referring now to FIG. 8, a visual output can alter a visibility of a virtual object. As shown in FIG. 8, a virtual object 30 can be provided with a visual output 44 that depicts the virtual object 30 as partially or entirely transparent (e.g., with reduced opacity). Such a visual output 44 can be provided, for example, as a user approaches the virtual object 30 and/or as the virtual object 30 approaches a user. Additionally or alternatively, the visual output 44 can include other changes to the appearance of the virtual object 30. For example, the visual output 44 can include a change to the brightness, darkness, contrast, color, saturation, sharpness, blur, resolution, and/or pixilation of the virtual object 30. In some embodiments, the virtual object 30 can change from a realistic depiction of an object to a depiction that appears illustrated (e.g., with sketch lines, in line drawing form, cartoon form, etc.). The visual output 44 can be applied to an entirety or only a portion of the virtual object 30.

Figure 9:
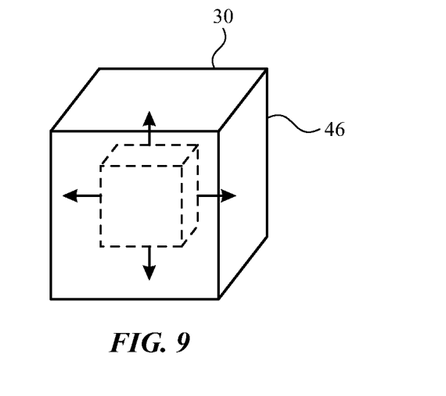
FIG. 9 illustrates a displayed view of a virtual object with a visual indicator providing a modification to the size of the virtual object, in accordance with some embodiments of the present disclosure.

Referring now to FIG. 9, a visual output can alter a characteristic of a virtual object. As shown in FIG. 9, a virtual object 30 can be provided with a visual output 46 that alters the size of the virtual object 30. Additionally or alternatively, the visual output 46 can alter other characteristics of the virtual object 30, such as shape, aspect ratio, position, orientation, and the like. The visual output 46 can be applied to an entirety or only a portion of the virtual object 30.

Figure 10:
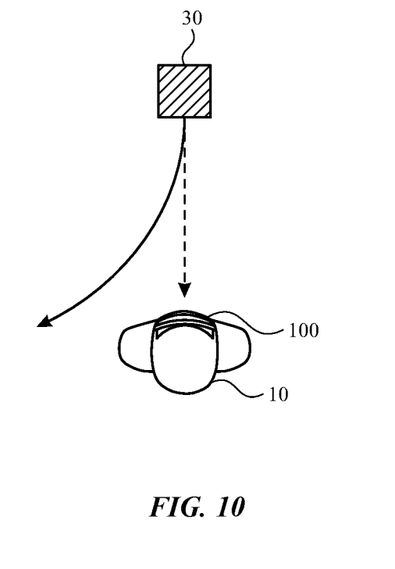
FIG. 10 illustrates a top view of a head-mountable device in use by a user and a trajectory of a virtual object as displayed by the head-mountable device, according to some embodiments of the present disclosure.
Figure 11:
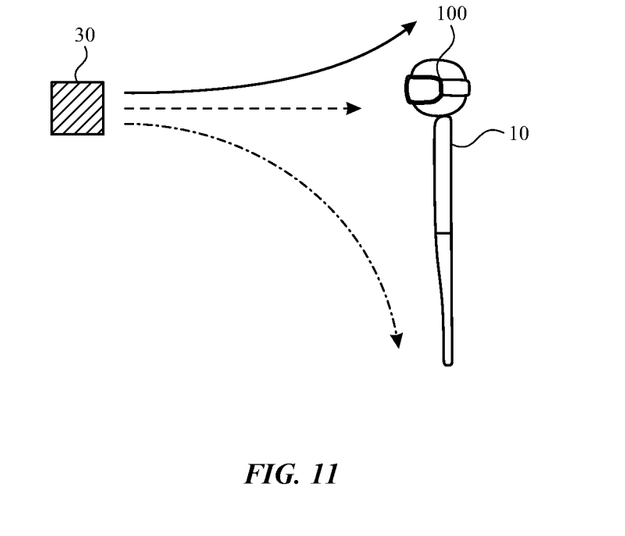
FIG. 11 illustrates a side view of a head-mountable device in use by a user and a trajectory of a virtual object as displayed by the head-mountable device, according to some embodiments of the present disclosure.

Referring now to FIGS. 10 and 11, a visual output can alter a motion of a virtual object. While FIGS. 10 and 11 show virtual objects outside a display, it will be understood that the depiction is of an environment as if it were real, and that the virtual objects may not actually correspond to physical objects in a physical environment. As shown in FIG. 10, a virtual object 30 can be displayed a moving toward a user. While an initial trajectory of the virtual object 30 may indicate that it would collide with the user, the trajectory can be altered to allow the user to recognize the object as being virtual. By further example, as shown in FIG. 11, a trajectory of the virtual object 30 can be altered in apparent violation of physical laws (e.g., contrary to the effects of gravity). Such motion contrary to physical laws in the physical environment can allow the user to recognize the object as being virtual, and the user can react accordingly.

Figure 12:
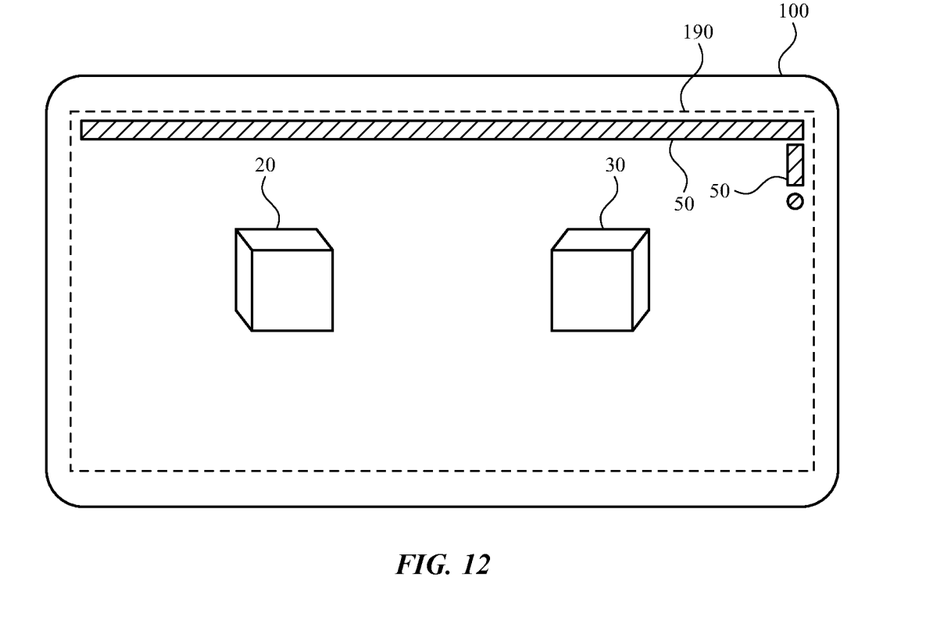
FIG. 12 illustrates a display of a head-mountable device providing a view of a physical object, a virtual object, and a visual indicator, in accordance with some embodiments of the present disclosure.

Referring now to FIG. 12, the visual output can be provided without attachment to any particular object. As shown in FIG. 12, the visual output 50 can be provided at a location on the display 190 that need not correspond to a region containing a virtual object 30 and/or a physical object 20. For example, the visual output 50 can be provided at or along a periphery of the display 190. By further example, the visual output 50 can include an icon and/or symbol that is provided at a given location on the display 190. The region of the visual output 50 can fixed and/or dynamic on the display 190. Such a visual output can allow a user to become generally aware of the presence of virtual objects without specifically identifying the particular objects that are virtual. This can allow the user to voluntarily identify objects as physical or virtual. Further output can be provided as a user operates the head-mountable device and/or attempts to interact with any given object. The visual output 50 can be provided whenever a particular object and/or type of object is within a view provided by the display 190. Additionally or alternatively, the visual output 50 can be provided whenever a particular object and/or type of object is within a threshold distance of the user and/or has other motion characteristics with respect to the user. Different visual outputs 50 can be provided under different conditions to indicate the respective conditions to the user. It will be understood that general outputs such as visual outputs 50 can be provided with or without other visual outputs described herein.

Figure 13:
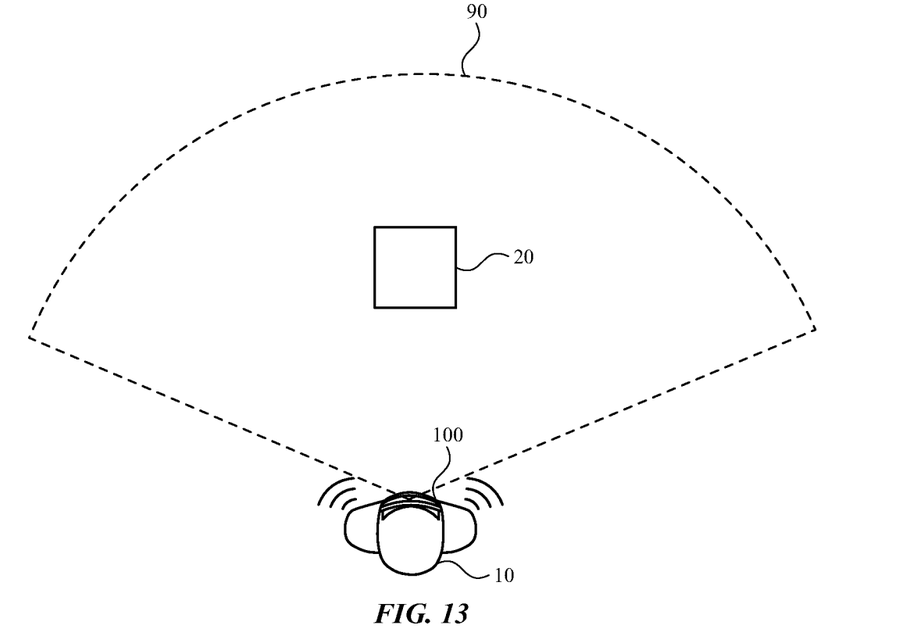
FIG. 13 illustrates a top view of a head-mountable device in use by a user and an output provided by the head-mountable device, according to some embodiments of the present disclosure.

Referring now to FIG. 13, a head-mountable device can provide sound or other audio or acoustic output to a user to enhance a user's awareness of physical and/or virtual objects. For example, the head-mountable device 100 can operate a speaker thereof or a speaker of another device to output sound to the user. The sound can be emitted based on one or more of a variety of detected conditions. For example, the sound can be emitted based on detection of a physical object 20 and/or one or more other characteristics of the physical object 20, such as distance from the user, velocity, acceleration, and/or other information. By further example, the sound can be emitted upon detection that the physical object when he is within a threshold distance from the user. The sound can allow a user to recognize the presence and/or other characteristics of the physical object 20 so that the user can react accordingly. While the use of sound is described herein with respect to a physical object 20, it will be understood that the sound can be emitted based on one or more of a variety of detected conditions with respect to a virtual object.

Sound can be emitted in a manner that is based on the corresponding detections. For example, the volume, pitch, duration, and/or other characteristics of the sound can be based on detected characteristics (e.g., proximity, etc.) and updated accordingly. Where separate sounds are emitted, the number of sounds, time between sounds, duration of each sound, and/or variations thereof can be provided based on detected characteristics (e.g., proximity, etc.) and updated accordingly.

Sound can be emitted by the head-mountable device or another device whether a given object is within a field-of-view 90 of the head-mountable device or outside the field-of-view 90. The sound can be provided as directional (e.g., stereo, surround sound, etc.). The direction of the sound can indicate to a user the direction in which the object of interest is located.

Figure 14:
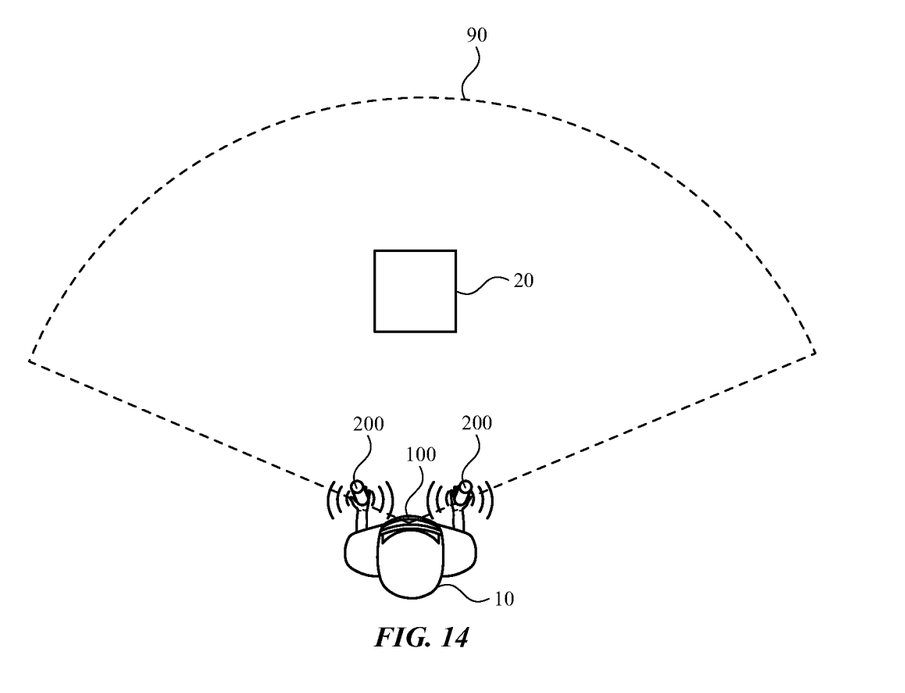
FIG. 14 illustrates a top view of a head-mountable device in use by a user and an output provided by external devices, according to some embodiments of the present disclosure.

Referring now to FIG. 14, a head-mountable device can provide haptic feedback to a user to enhance a user's awareness of physical and/or virtual objects. For example, the head-mountable device 100 can operate a haptic feedback device and/or communication with one or more external devices 200 that include haptic feedback components. The haptic feedback can be provided based on one or more of a variety of detected conditions. For example, the haptic feedback can be provided based on detection of a physical object 20 and/or one or more other characteristics of the physical object 20, such as distance from the user, velocity, acceleration, and/or other information. By further example, the haptic feedback can be provided upon detection that the physical object when he is within a threshold distance from the user. The haptic feedback can allow a user to recognize the presence and/or other characteristics of the physical object 20 so that the user can react accordingly. While the use of haptic feedback is described herein with respect to a physical object 20, it will be understood that the haptic feedback can be provided based on one or more of a variety of detected conditions with respect to a virtual object.

Haptic feedback can be provided by the head-mountable device or another device whether a given object is within a field-of-view 90 of the head-mountable device or outside the field-of-view 90. The haptic feedback can be provided as directional. For example, the haptic feedback components on a corresponding side of the user (e.g., a give one of multiple external devices) can be operated differently (e.g., with more activity) than another one of the haptic feedback components. By further example, the haptic feedback can be vibratory with a particular waveform pattern. For example, the waveform can be asymmetric to indicate direction, variable frequency, and/or variable amplitude corresponding to distance (e.g., proximity) to an object of interest. Accordingly, the characteristics of the haptic feedback can indicate to a user the direction, distance, and/or other characteristics of the object of interest.

In some embodiments, an output can be provided based on predictive detections by the head-mountable device. For example, where a physical object 20 is identified, whether or not within the field-of-view 90 of the head-mountable device 100, the head-mountable device 100 can determine whether a user is at risk of colliding with the physical object 20. Such a determination can be based on a trajectory of the physical object 20 and/or the user. If one or both trajectories end in a collision, an output can be provided, as described herein.

Additionally of alternatively, the determination can be based on a trajectory or other characteristic of a virtual object. For example, a virtual object can be displayed and the user can intend to intercept or otherwise interact with the virtual object. For example, the virtual object can be a ball that has a trajectory and the user can be engaged in an activity in which the user is to catch the ball. If the trajectory of the virtual object is such that the user, a portion of the user, and/or an object held by the user would risk collision with a physical object upon the user's attempt to interact with the virtual object, the head-mountable device 100 can provide an output to warn the user of the presence of the physical object in the way. Such an output can be helpful especially when the physical object is not in the field-of-view 90 of the head-mountable device 100. Such determinations can be made predictively, for example, based on the trajectory of the virtual object and optionally independently of the user's motion. Such predictive detections and early outputs can provide the user with time to react accordingly.

In some embodiments, a head-mountable device can provide outputs according to a mode of operation. For example, in a first mode, an output can be applied to virtual and/or physical objects according to the description provided herein. In a second mode, such outputs can be omitted regardless of detected conditions relating to the objects. In the second mode, the user can be provided with a more immersive experience that is not interrupted by outputs that help distinguish between virtual and physical objects. The selection between the first mode and the second mode can be managed by user input, so that the desired experience is provided according to user desires. By further example, the selection between the first mode and the second mode can be automated and based on one or more of a variety of conditions, such as time, location, detected objects, user identity, prior usage, and the like.

In some embodiments, a head-mountable device can provide outputs based on detections by an eye-tracking sensor. In addition to determining a direction of a user's gaze and/or an anticipated event (e.g., based on pupil size), the head-mountable device can determine whether a user expects a given object to be virtual or physical based on eye characteristics and/or other conditions. For example, a user may have a first eye characteristic (e.g., pupil size) and/or motion event (e.g., speed of limb movement) upon an attempt to interact with an object. For example, if the user believes an object is virtual, the user may move more quickly and react with a smaller pupil size. By further example, if the user believes an object is physical, the user may move more slowly and react with a larger pupil size. Based on corresponding detections, the head-mountable device can infer a user's belief regarding the nature of the object. The head-mountable device can provide an output if the actual nature (e.g., virtual or physical) of the object differs from the user's belief. The user can then be informed and act accordingly.

Accordingly, embodiments of the present disclosure provide a head-mountable device that helps a user distinguish between the physical objects and the virtual objects when desired. Indications provided by the head-mountable device can be visually applied to physical objects and/or virtual objects within a view provided by the head-mountable device. The indications can be provided to notify the user of objects outside the view provided by the head-mountable device. The indications can be visual, auditory, and/or haptic in nature. The indications can be provided based on a user's detected action, intention, and/or attention so that the indication is more targeted to a user's needs. The indications can be provided under particular conditions, so that the user can more easily maintain an immersive experience when the indications are not desired.

Various examples of aspects of the disclosure are described below as clauses for convenience. These are provided as examples, and do not limit the subject technology.

Clause A: a head-mountable device comprising: a camera configured to capture a view of a physical object in a physical environment; a display configured to display the view of the physical object and a virtual object; and a processor configured to: detect a distance between a user and the virtual object; and when the distance between the user and the virtual object is within a threshold, produce an output indicating to the user that the virtual object is not in the physical environment.

Clause B: a head-mountable device comprising: a camera configured to capture a view of a physical object in a physical environment; a sensor configured to detect a distance between a user and the physical object; a display configured to display the view of the physical object and a virtual object; and a processor configured to produce an output indicating to the user that the physical object is in the physical environment when the distance between the user and the physical object is within a threshold.

Clause C: a head-mountable device comprising: a camera configured to capture a view of physical objects in a physical environment; a display configured to display the view of the physical objects and a virtual object; and a processor configured to control operation of the display in either: a first mode in which a visual output is applied to the virtual object and not applied to the physical objects; or a second mode in which the visual output is not applied to the virtual object.

One or more of the above clauses can include one or more of the features described below. It is noted that any of the following clauses may be combined in any combination with each other, and placed into a respective independent clause, e.g., clause A, B, or C.

Clause 1: the output comprises a visual output produced on the display.

Clause 2: the processor is further configured to apply the visual output to the virtual object in the view without applying the output to the physical object in the view.

Clause 3: the visual output comprises an additive feature produced in a region of the view that contains the virtual object.

Clause 4: the visual output comprises a change to a visual feature of the virtual object, the visual feature comprising a shape, color, resolution, sharpness, or opacity of the virtual object in the view.

Clause 5: producing the output comprises altering a trajectory of the virtual object to avoid collision with the user.

Clause 6: an eye sensor configured to detect a characteristic of an eye of the user, wherein the processor is further configured to produce the output based on the characteristic of the eye.

Clause 7: the characteristic is a direction of a gaze of the eye.

Clause 8: the characteristic is a size of a pupil of the eye.

Clause 9: the processor is further configured to apply the visual output to the physical object in the view without applying the output to the virtual object in the view.

Clause 10: the visual output comprises an additive feature produced in a region of the view that contains the physical object.

Clause 11: the output comprises haptic feedback produced by an external device that is physically connected to the user and operably connected to the processor.

Clause 12: a speaker, wherein the output comprises a sound produced by the speaker.

Clause 13: the processor controls the operation of the display in either the first mode or the second mode based on a user selection.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
   a camera configured to capture a view of a physical object in a physical environment;
   a display configured to display the view of the physical object and a virtual object; and
   a processor configured to:
      detect a distance between a user and the virtual object;
      when the distance between the user and the virtual object is within a threshold, produce an output indicating to the user that the virtual object is not in the physical environment, wherein producing the output comprises altering a trajectory of the virtual object to avoid collision with the user; and
      when the distance between the user and the virtual object is not within the threshold, operating the display to display the view of the physical object and the virtual object without producing the output.

2. The head-mountable device of claim 1, wherein the output comprises a visual output produced on the display.

3. The head-mountable device of claim 2, wherein the processor is further configured to apply the visual output to the virtual object in the view without applying the output to the physical object in the view.

4. The head-mountable device of claim 2, wherein the visual output comprises an additive feature produced in a region of the view that contains the virtual object.

5. The head-mountable device of claim 2, wherein the visual output comprises a change to a visual feature of the virtual object, the visual feature comprising a shape, color, resolution, sharpness, or opacity of the virtual object in the view.

6. The head-mountable device of claim 1, wherein producing the output comprises altering a trajectory of the virtual object to avoid collision with the user.

7. The head-mountable device of claim 1, further comprising an eye sensor configured to detect a characteristic of an eye of the user, wherein the processor is further configured to produce the output based on the characteristic of the eye.

8. The head-mountable device of claim 7, wherein the characteristic is a direction of a gaze of the eye.

9. The head-mountable device of claim 7, wherein the characteristic is a size of a pupil of the eye.

10. A head-mountable device comprising:
a camera configured to capture a view of physical objects in a physical environment;
a display configured to display the view of the physical objects and a virtual object; and
a processor configured to control operation of the display in either:
a first mode in which the display outputs the view of the physical objects and a virtual object and a visual output is applied to the virtual object within a region of the view that contains the virtual object and not applied to the physical objects; or
a second mode in which the display outputs the view of the physical objects and a virtual object and the visual output is applied to each of the physical objects within regions of the view that each contain a corresponding one of the physical objects and not applied to the virtual object, wherein the processor controls the operation of the display in either the first mode or the second mode based on a user selection.

11. The head-mountable device of claim 10, wherein in the first mode the visual output comprises a first additive feature produced in the region of the view that contains the virtual object, and in the second mode the visual output comprises a second additive feature produced in the regions of the view that each contain the corresponding one of the physical objects.

12. The head-mountable device of claim 10, wherein in the first mode the visual output comprises a change to a visual feature of the virtual object, the visual feature comprising a shape, color, resolution, sharpness, or opacity of the virtual object in the view.

13. A head-mountable device comprising:
a camera configured to capture a view of a physical object in a physical environment;
a display configured to display the view of the physical object and a virtual object; and
a processor configured to:
operate the display to output the view of the physical object and the virtual object, the virtual object having an initial trajectory;
detect a distance between a user and the virtual object; and
when the distance between the user and the virtual object is within a threshold, alter the initial trajectory of the virtual object to move away from the user.

14. The head-mountable device of claim 13, the processor being further configured to, when the distance between the user and the virtual object is within the threshold, produce a visual output indicating to the user that the virtual object is not in the physical environment.

15. The head-mountable device of claim 14, wherein the processor is further configured to apply the visual output to the virtual object in the view without applying the output to the physical object in the view.

16. The head-mountable device of claim 14, the processor being further configured to, when the distance between the user and the virtual object is not within the threshold, operate the display to display the view of the physical object and the virtual object without producing the output.

17. The head-mountable device of claim 14, wherein the visual output comprises a change to a visual feature of the virtual object, the visual feature comprising a shape, color, resolution, sharpness, or opacity of the virtual object in the view.

* * * * *